June 4, 1963     T. W. PRESCOTT ET AL     3,092,357
AUTOMATIC BLIND LANDING SYSTEMS FOR AIRCRAFT
Filed July 11, 1960
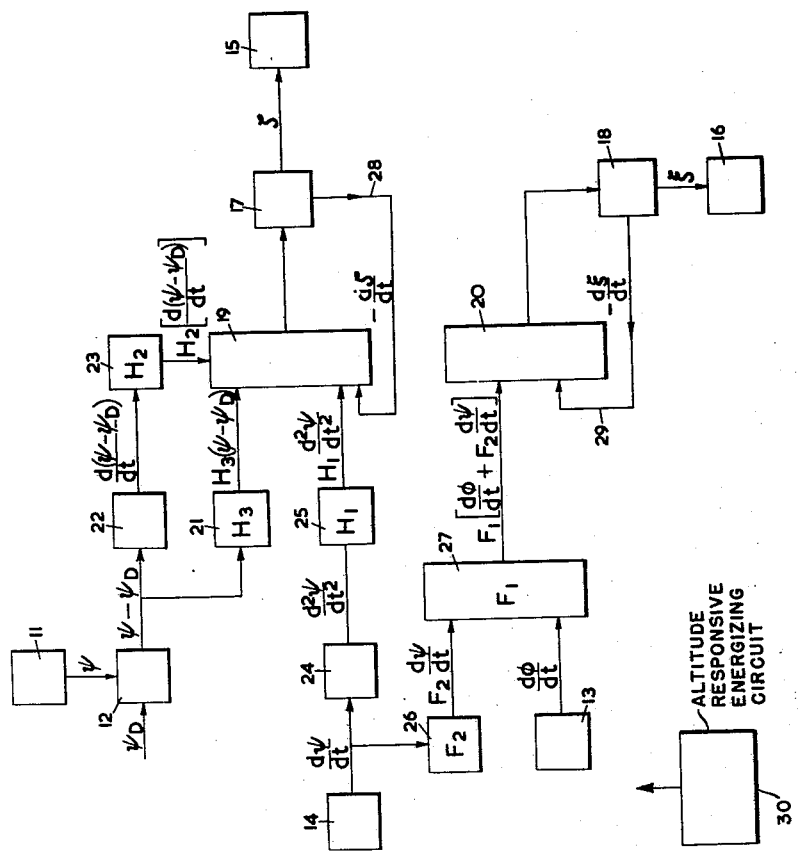
Thomas W. Prescott,
Frank H. Scrimshaw
Inventors
BY Cushman, Darby & Cushman
Attorney United States Patent Office
3,092,357
Patented June 4, 1963

3,092,357
AUTOMATIC BLIND LANDING SYSTEMS
FOR AIRCRAFT
Thomas Wright Prescott, Ravensden, and Frank Herbert Scrimshaw, Farnborough, England, assignors, by mesne assignments, to the Minister of Aviation in Her Majesty's Government of the United Kingdom of Great Britain and Northern Ireland, London, England
Filed July 11, 1960, Ser. No. 42,044
16 Claims. (Cl. 244—77)

This invention relates to automatic blind landing systems for aircraft of the kind in which the aircraft is flown under the control of an automatic pilot which actuates the aircraft control surfaces in response to signals representative of the aircraft's flight with respect to a desired approach path as defined by radio beams or the like so as to follow the desired path and more particularly to that part of the system for controlling the last phase of the approach path, say from a height above the runway generally in the order of twenty feet, down to touchdown, referred to hereinafter as the landing phase, and, the ground run along the runway.

With this type of arrangement when an aircraft tracks towards a runway on which there is a cross wind component the aircraft will have a heading error with respect to the runway, i.e. it will have a drift angle due to the cross wind component. It is desirable that the drift angle due to cross wind should be reduced to as small a value as possible by the time of touchdown so as to reduce to a minimum the side load on the undercarriage and to enable the ground run to be more easily executed. Ideally the aircraft should be flown so that at the instant of touchdown its OX or fuselage axis is parallel to the runway, the wings are level and the aircraft is travelling with no velocity component across the runway.

For manually controlled aircraft a skilled pilot achieves this manoeuvre by applying rudder just before touchdown in a sense to yaw the aircraft to the heading of the runway and applying aileron in the opposite sense to prevent the wing on the inside of the turn due to the rudder application from dropping, these control forces being applied during the landing phase. Accurate timing is necessary otherwise insufficient time is available to align the aircraft accurately with the runway, or, it is aligned too soon and it will acquire some of the speed of the cross component of wind before touchdown.

The object of the present invention is to provide an automatic blind landing system for aircraft whereby at the instant of touchdown the aircraft is aligned substantially parallel to the runway and the bank angle and velocity component of the aircraft across the runway are both reduced to a minimum.

In an automatic blind landing system of the kind referred to according to the invention on reaching the landing phase, control signals from the automatic pilot proportional to the aircraft heading with respect to the runway are automatically connected by means responsive to height above the runway to apply rudder control at a rate proportional to the heading displacement and to supplement the usual aileron control signal, which is normally of an amount proportional to the aircraft bank error with respect to the horizontal, by an amount proportional to the heading change with respect to the heading at the beginning of the landing phase.

For control in azimuth it is common practice with automatic pilots to include an autostabilising signal proportional to the rate of change of rate of change of heading error and in an automatic blind landing system of the type referred to according to the invention where such an autostabilising term is present it may be used to supplement the signal proportional to heading error to provide the control signal for application of rate of rudder on reaching the landing phase.

It is also known with automatic pilots to use a phase advance or rate term proportional to the rate of change of heading error and according to the present invention where such a term is present it may be used either alone or together with the autostabilising term referred to above to supplement the signal proportional to heading error to provide the control signal for application of rate of rudder on reaching the landing phase.

It is common practice with automatic pilots to use rate terms instead of displacement terms; e.g. for the reduction of bank errors instead of applying an aileron displacement of an amount proportional to the bank displacement with respect to the horizontal, aileron is applied at a rate proportional to the rate of change of bank displacement. In an automatic blind landing system of the type referred to according to the invention where the control signal for the normal application of aileron for bank control produces a rate of aileron application proportional to the rate of change of bank displacement as measured by the automatic pilot, on reaching the landing phase, this control signal is supplemented by a signal proportional to the rate of change of heading error.

The means for automatically connecting the required signals to the aileron and rudder amplifiers on reaching the landing phase may comprise any height responsive means of sufficient accuracy but in general it is preferred to use a radio altimeter accurate to the order of say five percent at a height of twenty feet.

One preferred arrangement according to the invention is illustrated by the accompanying diagrammatic drawing which is a block diagram setting out the various connections for controlling the rudder and ailerons of an aircraft on reaching the landing phase.

A compass is indicated at 11, an automatic pilot heading selector 12, roll rate gyroscope at 13 and yaw rate gyroscope at 14. The aircraft rudder and ailerons are indicated at 15, 16 are actuated by a rudder servo 17 and an aileron servo 18 under the control of signals from a rudder amplifier 19 and aileron amplifier 20, respectively. As stated above, the aircraft is flown by automatic pilot in response to signals representative of the aircraft's flight with respect to a desired approach and landing path as defined by radio beam so as to follow the desired path.

The basic control equation for the landing phase can be expressed as follows:

$$\frac{d\zeta}{dt} = \frac{H_1 d^2\psi}{dt^2} + H_2 \frac{d(\psi-\psi_D)}{dt} + H_3(\psi-\psi_D)$$

and $$\frac{d\xi}{dt} = F_1 \frac{d\phi}{dt} + F_2 \frac{d\psi}{dt}$$

where
$\zeta$=rudder angle
$\xi$=aileron angle
$\psi$=aircraft heading
$D$=runway heading
$\phi$=bank angle of aircraft
$t$=time $H_1$, $H_2$, $H_3$, $F_1$ and $F_2$ are control parameters which will vary from one aircraft type to another and for which the following values may be quoted as an example for one existing aircraft $H_1$=5 seconds, $H_2$=0.25, $H_3$=0.5 seconds $^{-1}$, $F_1$=1.5, $F_2$=0.35 when all angles are measured in degrees and the height of initiating the manoeuvre is 20 feet.

The heading angle $\psi$ of the aircraft is transmitted in any well known manner from the compass 11 to the heading selector 12 of the automatic pilot and the human pilot manually presets the heading of the runway $\psi_D$ on the same heading selector which thus provides a signal $(\psi-\psi_D)$ representative of the aircraft heading error with respect to the runway heading. This signal is multiplied by the factor $H_3$ in a well known manner at 21 and fed to the rudder amplifier 19 and is also fed to a resistance/condenser differentiating network 22 to provide a signal representative of rate of change of heading error with respect to the runway $$\frac{d(\psi-\psi_D)}{dt}$$

which is multiplied by the factor $H_2$ at 23 and also fed to the rudder amplifier 19. At the same time signals representative of rate of change of aircraft heading $$\frac{d\psi}{dt}$$

and rate of change of bank angle $$\frac{d\phi}{dt}$$

are obtained from the yaw rate gyroscope 14 and the roll rate gyroscope 13, respectively. The heading rate signal $$\frac{d\psi}{dt}$$

is fed to a resistance/condenser differentiating network 24 which provides an output signal which is an autostabilising term proportional to the rate of change of rate of change of heading and this is multiplied by a factor $H_1$ at 25 and fed to the rudder amplifier 19. The rudder amplifier 19 provides an output signal for actuating the rudder servo 17 to move the rudder and a feedback connection 28 from the rudder servo 17 feeds a signal $$-\frac{d\zeta}{dt}$$

to amplifier 19 so that the rate of rudder application is given by $$\frac{d\zeta}{dt}=H_1\frac{(d^2\psi)}{dt^2}+H_2\frac{d(\psi-\psi_D)}{dt}+H_3(\psi-\psi_D)$$

The heading rate signal $$\frac{d\psi}{dt}$$

is also multiplied by a factor $F_2$ at 26 and added to the bank rate signal $$\frac{d\phi}{dt}$$

and the combined signal is then multiplied by a factor $F_1$ at 27 and fed to the aileron amplifier 20. The aileron amplifier 20 provides an output signal for actuating the ailerons, and a feedback connection 29 from the aileron servo 18 feeds a signal $$-\frac{d\xi}{dt}$$

to amplifier 20 so that the rate of aileron application is given by $$\frac{d\xi}{dt}=F_1\left[\frac{d\phi}{dt}+F_2\frac{d\psi}{dt}\right]$$

The aforesaid circuits are automatically energized for the landing phase by signals emanating from a height determining circuit 30, when the craft is a given distance above the runway.

The effect of the above control signals being applied on reaching the landing phase is substantially as follows:

(a) Rudder is applied at a rate proportional to the difference between the aircraft heading and the runway heading, the $H_3(\psi-\psi_D)$ term, causing the aircraft to be yawed to the runway heading and side-slipped into wind.

(b) At the instant of touchdown although the aircraft is pointing down the runway the rudder application is maintained in the sense to maintain side slip into the wind to reduce the tendency of the aircraft to move laterally across the runway due to the cross wind.

(c) The $$H_2\frac{d(\psi-\psi_D)}{dt}$$

term is a phase advance term which adds damping to the yawing motion and reduces any tendency to overshoot the runway or datum heading. Also, as $(\psi-\psi_D)$ has a finite value at the beginning of the landing phase when $t=0$, the initial signal $$\frac{d(\psi-\psi_D)}{dt}$$

obtained through the resistance/condenser network 22 will apply an impulse into the rudder amplifier and so accelerate the initial movement of the rudder.

(d) The $$H_1\frac{d^2\psi}{dt^2}$$

term is an autostabilising yaw signal and is present in many present day automatic pilots and tends to suppress any short term yawing oscillations.

(e) The $$F_1\frac{d\phi}{dt}$$

term is the usual aileron control term which applies aileron at a rate proportional to the rate of change of bank error. However, with the application of rudder referred to above, the wing on the inside of the turn will tend to drop and therefore to maintain the wings level as is required this aileron control signal must be supplemented to apply opposite aileron to counteract the adverse rolling movement. The above aileron control is supplemented by a function of the rate of change of heading angle, $$F_2\frac{d\psi}{dt}$$

which effectively applies aileron proportional to the angle through which the aircraft has yawed with respect to the heading at the beginning of the landing phase.

Although it is desirable to incorporate the autostabilising term $$H_1\frac{d^2\psi}{dt^2}$$

and/or the phase advance and impulse rate term $$H_2\frac{d(\psi-\psi_D)}{dt}$$

in the control equation for the application of rudder, in practice, if either or both of these terms are not readily available from an existing automatic pilot in an aircraft, improved control in the landing phase may still be achieved by applying rudder at a rate proportional to the heading displacement $\psi-\psi_D$ alone or together with either the autostabilising term or the rate term whichever may be available, and, supplementing the aileron control signal by an amount proportional to a function of heading change.

It is also to be noted that amount terms can be used instead of rate terms for the application of aileron. Thus, instead of applying aileron at a rate proportional to a function of rate of change of bank angle and rate of change of heading angle, aileron may be applied of an amount proportional to a function of the actual bank angle with respect to the horizontal and the heading change measured from the original heading of the aircraft when the drift removal manoeuvre was initiated at the beginning of the landing phase.

We claim:
1. An aircraft automatic landing system having automatic pilot means including heading selector means for selection of a desired heading, signal controlled means for applying rudder, signal controlled means for applying aileron, rudder signal means affording a signal dependent on heading displacement from a selected heading and operative together with said rudder applying means to apply rudder at a rate proportional to such heading displacement, and aileron signal means affording two aileron signal components proportional respectively only to rate of change of bank angle and to rate of change of heading and being operative together with said aileron applying means to apply aileron; the system also having height responsive control means for rendering said automatic pilot means operative at and below a predetermined low height to remove without undue banking any heading displacement from a selected heading and maintain substantial rudder applied at touch down.

2. An aircraft automatic landing system as claimed in claim 1, in which the signal controlled means for applying rudder include means affording a feed back rudder signal component dependent upon rate of rudder application.

3. An aircraft automatic landing system as claimed in claim 1, in which the signal controlled means for applying aileron include means affording a feed back aileron signal component dependent upon rate of aileron application.

4. An aircraft automatic landing system as claimed in claim 1, in which the rudder signal means afford an autostabilizing rudder signal component dependent upon rate of change of rate of change of heading displacement from a selected heading.

5. An aircraft automatic landing system as claimed in claim 1, in which the rudder signal means afford a phase advance rudder signal component dependent on rate of change of heading displacement from a selected heading.

6. An aircraft automatic landing system as claimed in claim 2, in which the rudder signal means afford, a phase advance rudder signal component dependent upon the rate of change of heading displacement from a selected heading and an autostabilizing rudder signal component dependent upon the rate of change of said rate of change of such heading displacement.

7. An aircraft automatic landing system having autopilot means including heading selector means for selection of a desired heading, signal controlled means for applying rudder and affording a feed back rudder signal component dependent upon rate of rudder application, signal controlled means for applying aileron and affording a feed back aileron signal component dependent upon rate of aileron application, rudder signal means affording rudder signal components dependent respectively upon heading displacement from a selected heading, upon the rate of change of such heading displacement, and upon the rate of change of said rate of change of such heading displacemnt, and being operative together with said rudder applying means to apply rudder at a rate proportional to such heading displacement, and, aileron signal means affording aileron signal components dependent respectively upon the rate of change of bank angle and on the rate of change of heading, and being operative together with said aileron applying means to apply aileron; the system also having height responsive control means operative at and below a predetermined low height to remove without undue banking any heading displacement from a selected heading and maintain substantial rudder applied at touch down.

8. An aircraft automatic landing system including signal controlled rudder applying means, signal controlled aileron applying means, means for selecting a desired heading, rudder signal means, aileron signal means and height responsive control means whereby at and below a predetermined low height just prior to touch down said rudder applying means are operative under the control of at least one signal from said rudder signal means to apply rudder at a rate dependent upon heading displacement from a selected heading, and said aileron applying means are operative to apply aileron under the control only of a signal from said aileron signal means which is dependent upon the sum of rate of change of bank angle and rate of change of heading displacement from a selected heading, said height responsive control means thus operative to remove without undue banking any heading displacement from a selected heading and maintain substantial applied rudder at touch down.

9. An aircraft automatic landing system as claimed in claim 8 wherein said rudder applying means are operative under the control of signals from the rudder signal means, of which signals one is a phase advance signal dependent upon rate of change of heading displacement.

10. An aircraft automatic landing system as claimed in claim 8, wherein said rudder applying means are operative under the control of signals of which one is a short term autostabilizing signal dependent upon rate of change of rate of change of heading displacement from a selected heading.

11. An aircraft automatic landing system as claimed in claim 8, wherein said rudder applying means include means for producing and feeding back a signal dependent upon the rate of change of rudder angle.

12. An aircraft automatic landing system as claimed in claim 8, wherein said aileron applying means include means for producing and feeding back a signal dependent upon the rate of change of aileron angle.

13. An aircraft automatic landing system including signal controlled rudder applying means having means for producing and feeding back a signal dependent upon rate of change of rudder angle, signal controlled aileron applying means, means for selecting a desired heading, rudder signal means for producing signals dependent upon heading displacement from a selected heading and a phase advance signal dependent upon rate of change of said displacement, aileron signal means for producing a signal dependent upon the sum of rate of change of bank angle and rate of change of heading displacement from a selected heading, and height responsive control means whereby at and below a predetermined height just prior to touch down said rudder applying means are operative under the control of said signals produced by said rudder signal means to apply rudder at a rate dependent upon heading displacement from a selected heading and said aileron applying means are operative under the control only of said signal produced by said aileron signal means to apply aileron, to remove without undue banking any heading displacement from a selected heading and maintain substantial rudder applied at touch down.

14. An aircraft automatic landing system as claimed in claim 13 wherein said rudder signal means also produce a short term autostabilizing signal dependent upon the rate of change of rate of change of heading displacement which also is used in the control of said rudder applying means.

15. An aircraft automatic landing system as claimed in claim 13, wherein said aileron applying means include means for producing and feeding back a signal dependent upon rate of change of aileron angle whereby aileron is applied at a rate dependent upon the sum of rate of change of bank angle and rate of change of heading displacement.

16. An aircraft automatic landing system including signal controlled rudder applying means having means for producing and feeding back a signal dependent upon rate of change of rudder angle, signal controlled aileron applying means having means for producing and feeding back a signal dependent upon rate of change of aileron angle, means for selecting a desired heading, rudder signal means for producing a signal dependent upon heading displacement from a selected heading, a phase advance signal dependent upon rate of said displacement and a short term autostabilizing signal dependent upon rate of change of rate of change of said displacement, aileron signal means for producing a signal dependent upon the sum of rate of change of bank angle and rate of change of heading displacement from a selected heading, and height responsive control means whereby at and below a predetermined height just prior to touch down said rudder applying means are operative under the control of signals produced by said rudder signal means to apply rudder at a rate dependent upon heading displacement from a selected heading and said aileron applying means are operative under the control only of said signal produced by the aileron signal means to apply aileron at a rate dependent upon the sum of rate of change of bank angle and rate of change of said heading displacement, to remove without undue banking any heading displacement from a selected heading and maintain substantial rudder applied at touch down.

References Cited in the file of this patent

UNITED STATES PATENTS

| | | |
|---|---|---|
| 2,676,770 | Schuck | Apr. 27, 1954 |
| 2,987,276 | Osder | June 6, 1961 |
| 3,007,656 | Miller | Nov. 7, 1961 |